United States Patent
Fujita et al.

(10) Patent No.: US 6,507,697 B1
(45) Date of Patent: Jan. 14, 2003

(54) DATA RECORDING AND REPRODUCTION APPARATUS, METHOD AND SYSTEM FOR SENDING OUT DATA

(75) Inventors: Hiroyuki Fujita, Kanagawa (JP); Norikazu Ito, Kanagawa (JP); Satoshi Yoneya, Kanagawa (JP); Masakazu Yoshimoto, Kanagawa (JP); Yoshinori Koishikawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/313,412

(22) Filed: May 18, 1999

(30) Foreign Application Priority Data

May 19, 1998 (JP) .......................................... 10-136888

(51) Int. Cl.[7] .......................... H04N 5/781; H04N 5/222

(52) U.S. Cl. ........................ 386/125; 348/722; 725/145

(58) Field of Search ................................. 386/1, 45, 46, 386/95, 125, 126; 348/473, 563, 722, 569, 906; 707/104.1, 204; 725/32, 36, 114–117, 143–147; 360/91, 93, 97.03, 97.04, 98.01; H04N 5/781, 5/76, 9/79, 5/92, 5/222

(56) References Cited

U.S. PATENT DOCUMENTS

| | | | | |
|---|---|---|---|---|
| 5,528,746 A | * | 6/1996 | Yumine et al. | 360/92 |
| 5,761,371 A | * | 6/1998 | Ohno et al. | 386/46 |
| 6,046,780 A | * | 4/2000 | Tani | 348/722 |
| 6,088,703 A | * | 7/2000 | Kaneko | 386/46 |

* cited by examiner

Primary Examiner—Thai Tran
(74) Attorney, Agent, or Firm—Frommer Lawrence & Haug LLP; William S. Frommer

(57) ABSTRACT

This invention relates to a data recording and reproduction apparatus, and a method and a system for sending out data for preparing a log file of material codes and a sending time. The video server comprises a storage means utilizing a randomly accessible storage media, and a server controller for controlling the storage means and multiple input and output ports connected to the storage means. The input port includes a multiplexer for inserting the material code to identify video source onto compressed video signals derived from video signals fed to the input ports. Video signals with their material codes superimposed thereon are recorded as video sources on the storage means. A material code is extracted from any video signal that is reproduced, and a log file of the sending data (sending time and data including material code relating to the sent-out material) is generated.

15 Claims, 9 Drawing Sheets

| # | TIME (SENDING TIME) | CODE (MATERIAL CODE) |
|---|---|---|
| 1 | 08:00:00:00 | CM0022 |
| 1 | 08:00:15:00 | CM0309 |
| 1 | 08:00:30:00 | CM0068 |
| 2 | 08:01:00:00 | PGM0101 |

FIG. 4

| LONGITUDINAL TIME CODE BIT NO. | | | VITC BIT NO. | | |
|---|---|---|---|---|---|
| | | SYNC BIT "1" SYNC BIT "0" | 0 1 | 0~1 | SYNCHRONOUS BITS |
| 0 1 2 3 4 5 6 7 | 1 2 4 8 | UNITS OF FRAMES 1st BINARY GROUP | 2 3 4 5 6 7 8 9 | 2~5 6~9 | NUMBER OF UNITS OF FRAME FIRST BINARY GROUP |
| | | SYNC BIT "1" SYNC BIT "0" | 10 11 | 10~11 | SYNCHRONOUS BITS |
| 8 9 10 11 12 13 14 15 | 10 20 | TENS OF FRAMES DROP FRAME FLAG COLOR FRAME FLAG 2nd BINARY GROUP | 12 13 14 15 16 17 18 19 | 12~13 14 15 16~19 | NUMBER OF TENS OF FRAME DROP FRAME FLAG COLOR FRAME FLAG SECOND BINARY GROUP |
| | | SYNC BIT "1" SYNC BIT "0" | 20 21 | 20~21 | SYNCHRONOUS BITS |
| 16 17 18 19 20 21 22 23 | 1 2 4 8 | UNITS OF SECONDS 3rd BINARY GROUP | 22 23 24 25 26 27 28 29 | 22~25 26~29 | NUMBER OF UNITS OF SECOND THIRD BINARY GROUP |
| | | SYNC BIT "1" SYNC BIT "0" | 30 31 | 30~31 | SYNCHRONOUS BITS |
| 24 25 26 27 28 29 30 31 | 10 20 | TENS OF SECONDS PHASE CORRECTION BIT  FIELD MARK 4th BINARY GROUP | 32 33 34 35 36 37 38 39 | 32~34 35 36~39 | NUMBER OF TENS OF SECOND FIELD MARK ("0"-- FIRST, THIRD FIELD) ("1"-- SECOND, FORTH FIELD) FORTH BINARY GROUP |
| | | SYNC BIT "1" SYNC BIT "0" | 40 41 | 40~41 | SYNCHRONOUS BITS |
| 32 33 34 35 36 37 38 39 | 1 2 4 8 | UNITS OF MINUTES 5th BINARY GROUP | 42 43 44 45 46 47 48 49 | 42~45 46~49 | NUMBER OF UNITS OF MINUTE FIFTH BINARY GROUP |
| | | SYNC BIT "1" SYNC BIT "0" | 50 51 | 50~51 | SYNCHRONOUS BITS |
| 40 41 42 43 44 45 46 47 | 10 20 40 | TENS OF MINUTES BINARY GROUP FLAG BIT 6th BINARY GROUP | 52 53 54 55 56 57 58 59 | 52~55 55 56~59 | NUMBER OF TENS OF MINUTE BINARY GROUP FLAG SIXTH BINARY GROUP |
| | | SYNC BIT "1" SYNC BIT "0" | 60 61 | 60~61 | SYNCHRONOUS BITS |
| 48 49 50 51 52 53 54 55 | 1 2 4 8 | UNITS OF HOURS 7th BINARY GROUP | 62 63 64 65 66 67 68 69 | 62~65 66~69 | NUMBER OF UNITS OF HOUR SEVENTH BINARY GROUP |
| | | SYNC BIT "1" SYNC BIT "0" | 70 71 | 70~71 | SYNCHRONOUS BITS |
| 56 57 58 59 60 61 62 63 | 10 20 | TENS OF HOURS BINARY GROUP FLAG BIT BINARY GROUP FLAG BIT 8th BINARY GROUP | 72 73 74 75 76 77 78 79 | 72~73 74 75 76~79 | NUMBER OF TENS OF HOUR UNDEFINED BINARY GROUP FLAG EIGHTH BINARY GROUP |
| | | SYNC BIT "1" SYNC BIT "0" | 80 81 | 80~81 | SYNCHRONOUS BITS |
| 64 "0" 65 "0" 66 "1" ⋮ 77 "1" 78 "1" 79 "1" | | SYNC WORD (16 BITS) CRC CODE | 82 83 84 85 86 87 88 89 | 82~89 | CRC CODE (CYCLIC REDUNDANCY CHECK) |
| 80bit | | | 90bit | | |

FIG. 5

| TIME (SENDING TIME) | CODE (MATERIAL CODE) |
|---|---|
| 08:00:00:00 | CM0022 |
| 08:00:15:00 | CM0309 |
| 08:00:30:00 | CM0068 |
| 08:01:00:00 | PGM0101 |

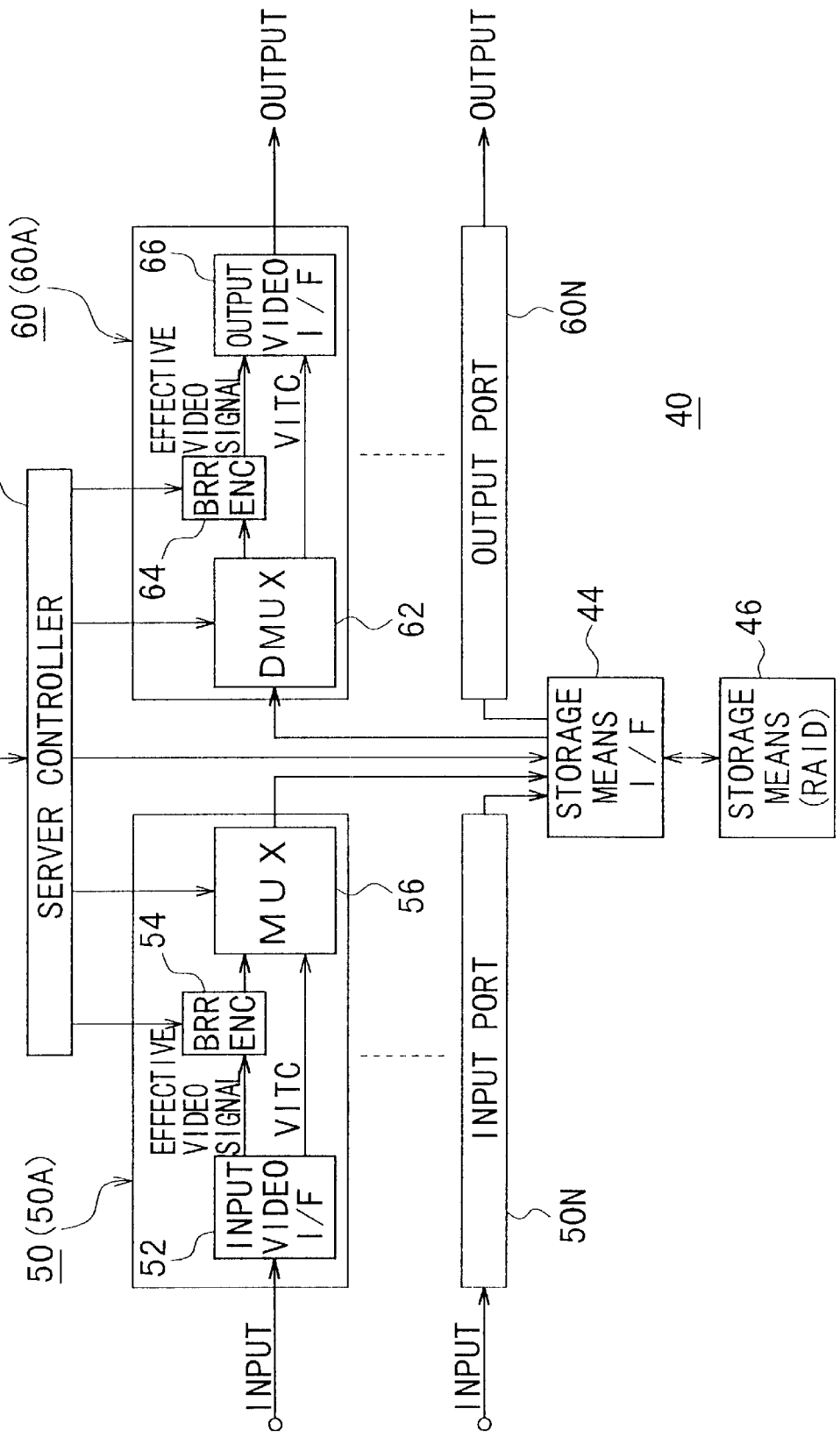

FIG. 7A

FILE ENTRY (FE)
| NAME OF FILE |
| LINK TO FIRST RE |

FIG. 7B

RECORD ENTRY (RE)
| LINK TO NEXT RE |
| LEADING LOCATION DATA |
| RECORD LENGTH OF CONTINUOUS AREA |

FIG. 7C

FREE SPACE LIST (FSL)
| LINK TO NEXT FSL |
| LEADING LOCATION DATA |
| RECORD LENGTH OF CONTINUOUS SPACE AREA |

FIG. 7D

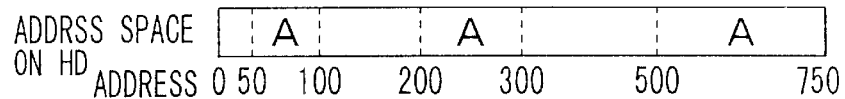

ADDRESS SPACE ON HD — ADDRESS 0 50 100 200 300 500 750

FIG. 7E

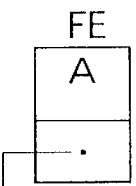

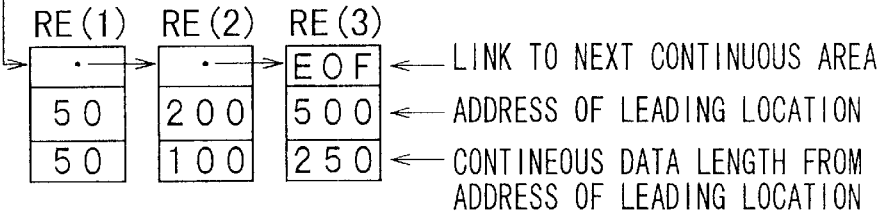

RE(1) RE(2) RE(3)
- EOF ← LINK TO NEXT CONTINUOUS AREA
- 50 / 200 / 500 ← ADDRESS OF LEADING LOCATION
- 50 / 100 / 250 ← CONTINUOUS DATA LENGTH FROM ADDRESS OF LEADING LOCATION

FIG. 7G

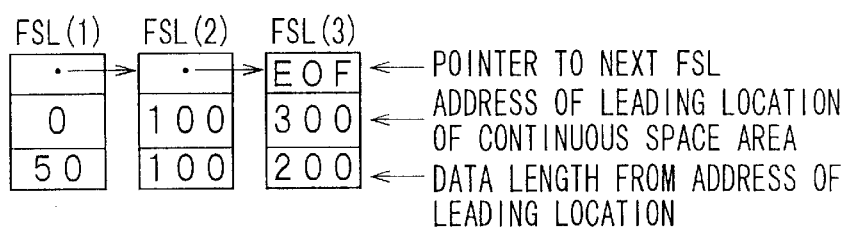

FSL(1) FSL(2) FSL(3)
- EOF ← POINTER TO NEXT FSL
- 0 / 100 / 300 ← ADDRESS OF LEADING LOCATION OF CONTINUOUS SPACE AREA
- 50 / 100 / 200 ← DATA LENGTH FROM ADDRESS OF LEADING LOCATION

DATA RECORDING AND REPRODUCTION APPARATUS, METHOD AND SYSTEM FOR SENDING OUT DATA

BACKGROUND OF THE INVENTION

1. Field of the Invention

The present invention relates to a data recording and reproduction apparatus, and a method and a system for sending out data, which respectively are applied preferably to such appliances as a video data sending device for sending out video sources for use in commercials, broadcast programs, etc. More particularly, the invention relates to a data recording and reproduction apparatus, and a method and a system for sending out data, wherein material code constituting identification code to video signal is inserted into the video signal constituting the video source, and the video source thus obtained is stored into randomly accessible storage means so that simply extracting material code from the stored video source permits generation of history information about video source output.

2. Description of the Related Art

Automatic cassette changer apparatus utilizing VTR (video tape recorder) as video source storing means have been used extensively as a video data sending system for sending out video source for use in commercials and broadcast programs etc. Respective video sources are recorded on video cassette tapes that are stored on cassette racks inside the automatic cassette changer apparatus. When, say, a commercial is to be broadcast, an appropriate video cassette tape is retrieved from the cassette racks and its contents are reproduced so as to send out video signals of the commercial in question.

Such video data sending device generates output history information (log file) that is used for subsequent verification of actually broadcast programs including commercial video signals in particular (broadcast verification) The output history information utilizes material codes assigned to the respective video sources as material identification information. The material code is superimposed on the video source.

Generally, material codes are inserted into specific lines using vertical retrace period thereof. When video sources are reproduced, the material codes superimposed thereon are reproduced, extracted and separated so as to generate the output history information. A search through the output history information permits verification of specific video sources and of the times at which the video sources have been actually sent out. This provides an easy confirmation that specific commercial has been actually broadcast.

Where the automatic cassette changer apparatus utilizes VTR as storage means as mentioned above, video sources are recorded as composite signals (digital video signals) on VTR. This means that blanking signals are recorded simultaneously with the video sources.

Because material codes are inserted into specific lines of blanking signals, it is possible to record on the VTR the entire video sources with their material codes included therein. It is then relatively easy to generate output history information by extracting and separating the material codes from the video sources while said video sources are being reproduced.

Today, there is a growing tendency to store video sources in mass storage means using randomly accessible storage media (such as hard disks) Where the above video sources are stored using such storage means, only the video signals, which are free of blanking signal portions, are stored as the video source. That is because the video sources are subject to data processing such as video signal compression before being stored into the storage means.

With no material code for identification of the video sources included in the video sources, there is no way of conventionally detecting material codes for identifying the video sources even when the video sources are retrieved. No output history information can be generated from such video sources.

SUMMARY OF THE INVENTION

It is therefore an object of the present invention to overcome the above and other deficiencies of the related art and to provide a data recording and reproduction apparatus, and a method and a system for sending out data, wherein, when randomly accessible storage means is used, material codes or the like are inserted into video sources so that history information of actually sending out commercials and broadcast programs etc., is easily generated.

In carrying out the invention and according to one aspect thereof, there is provided a data recording and reproduction apparatus for recording and/or reproducing data. The apparatus comprises nonlinear accessible recording media, a plurality of input and output processing means for adding to the data an identification code of the data with time slots respectively assigned thereto, outputting the added data to the recording media and reading out from the recording media the data recorded on the recording media with the same time slots as the above, extracting means for extracting the identification code output as sending data from the input and output processing means and included in the sending data, and history information generating means for generating history information constituted by the identification code extracted from the extracting means, said identification code including a sending time.

According to another aspect of the invention, there is provided a system for sending out data. The system comprises nonlinear accessible storage media for storing the data, a plurality of input and output processing means, a data recording and reproduction apparatus for recording the data on the recording media by allowing the plurality of input and output processing means to obtain access to the recording media with time slots respectively assigned thereto and for reading out from the recording media the data recorded thereon, extracting means for receiving the data output from the data recording and reproduction means and for extracting from the data an identification code of and sending time of the data to be sent out, history information generating means for generating history information from the identification code and the sending time extracted by the extracting means, and sending means for receiving the data output from the data recording and reproduction means and for sending out the received data to an external.

According to further aspect of the invention, there is provided a method for sending out data. In the method, nonlinear accessible recording media and a plurality of input and output processing means are used. The plurality of input and output processing means get access to the recording media with respectively time slots assigned thereto to record the data on the recording media and read out from the recording media the data recorded thereon to send out the data. The method comprises preferably adding an identification code of material data to the material data and recording the material data containing the identification code on the recording media, said material data being output from the plurality of input and output processing means and being data of a predetermined unit, reading out from the recording media the material data recorded thereon with the same time slots assigned thereto as the above and outputting the read material data, extracting the identification code of the material data from the output material data, generating history information composed of the extracted identification code and the sending time of the material data.

After video signals are compressed, the invention allows the material code, namely identification code of the video data, to be inserted into the compressed video signals. Thus, storage means stores the video data containing the material codes.

The material codes are separated from the video data when the latter are read out from the storage means. The separated material codes may then be used to generate output history information. Therefore, this invention provides a data recording and reproduction apparatus, and a method and a system for sending out data, whereby the history information of actually sending out commercials and broadcast programs etc., is easily generated.

Other objects, features and advantages of the invention will become more apparent upon a reading of the following description and appended drawings.

BRIEF DESCRIPTION OF THE DRAWINGS

FIG. 4 is a schematic view showing a relationship between SMPTE time code and VITC code;

FIG. 5 is a schematic view of output history information;

FIG. 6 is a partial schematic flow diagram of a video server embodying the invention;

FIGS. 7A through 7G are respectively a view showing an embodiment for controlling a file in a filing system;

DESCRIPTION OF THE PREFERRED EMBODIMENTS

A data recording and reproduction apparatus, and a system and a method for sending out data will now be described in detail as preferred embodiments of the present invention with reference to the accompanying drawings.

Figure 1:
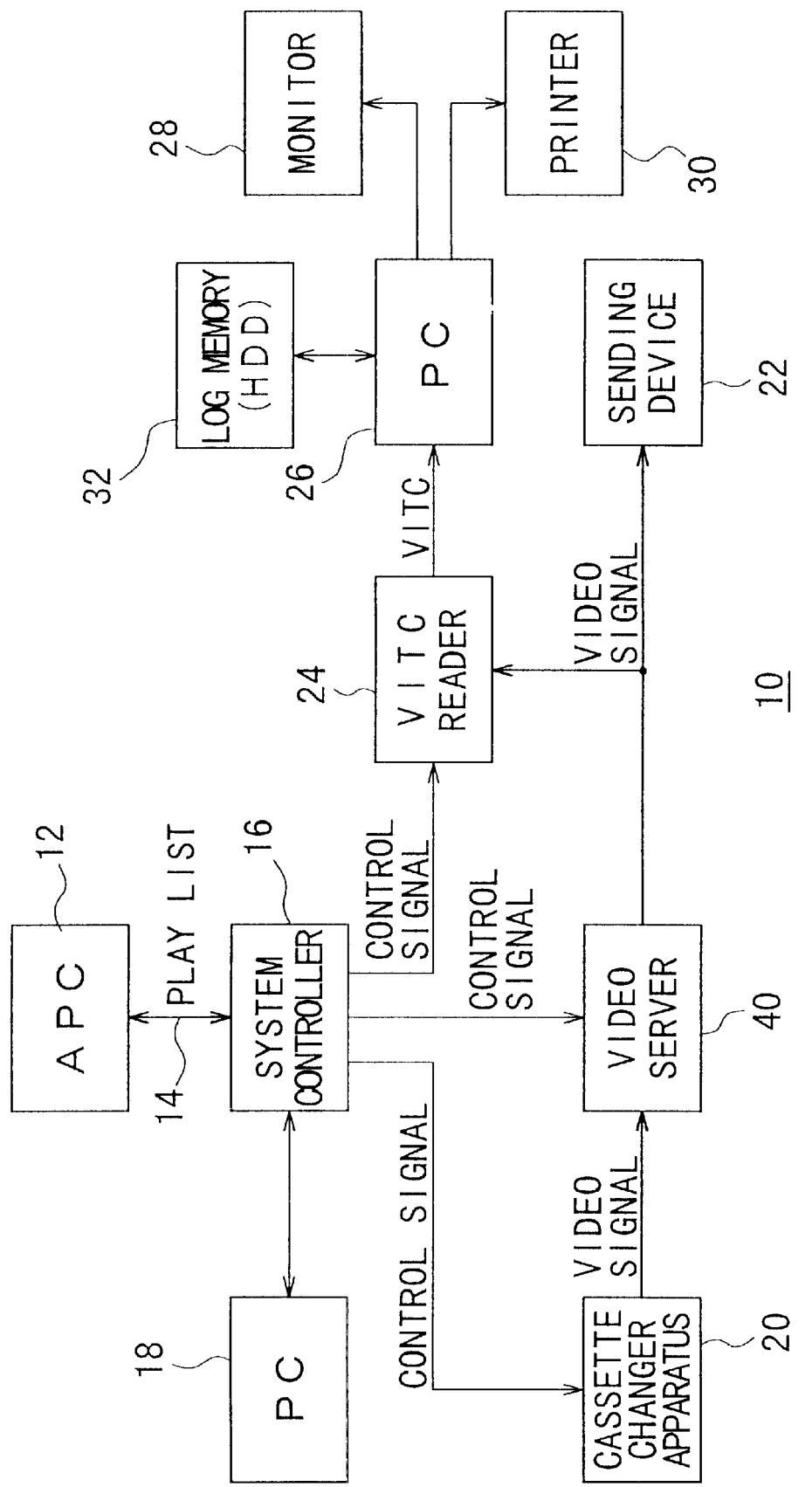
FIG. 1 is a partial schematic flow diagram of a data recording and reproducing apparatus applied to a system for sending out the data, embodying the invention.

FIG. 1 is a partial schematic flow diagram showing a system for sending out data (data sending-out system) including a data recording and reproducing apparatus 10 as an embodiment of the invention, which is applied to a video sending system such as a commercial and a broadcast program. As shown in FIG. 1, the data sending-out system comprises an automatic program controller (APC) 12, a system controller 16, personal computer (PC) 18 that is used for a user interface for the system controller 16, video server 40, a sending device 22, a VITC (Vertical Interval Time code) reader 24, terminal processing device (personal computer) 26, a log memory 32, a monitor 28 and printer 30.

APC 12 controls all material data (this material data means data including video data and audio data: hereinafter called "material data") output by a VITC broadcasting station. The APC 12 generates a play list composed of sending times of output material code etc., as shown in FIG. 2.

As illustrated, the list comprises the material codes each indicating an identification code of the material data to be sent out, and sending times (which indicate flame, hour, minute and second, respectively from left to right) of these material codes. In other words, the list is a sending list for sending out commercials and broadcast programs, The system controller 16 is connected to the APC 12 through a LAN 14 (local area network) inside the broadcasting station. The system controller 16 controls a record, a reproduction and the like in accordance with a cassette changer apparatus 20 constituting an automatic changer apparatus, a video server 40 and VITC reader 24.

The PC 18 is a user interface of the system controller 16. An indication on the user interface such as a graphic user interface (GUI) allows an operator to carry out various operations.

Figures 2, 3:
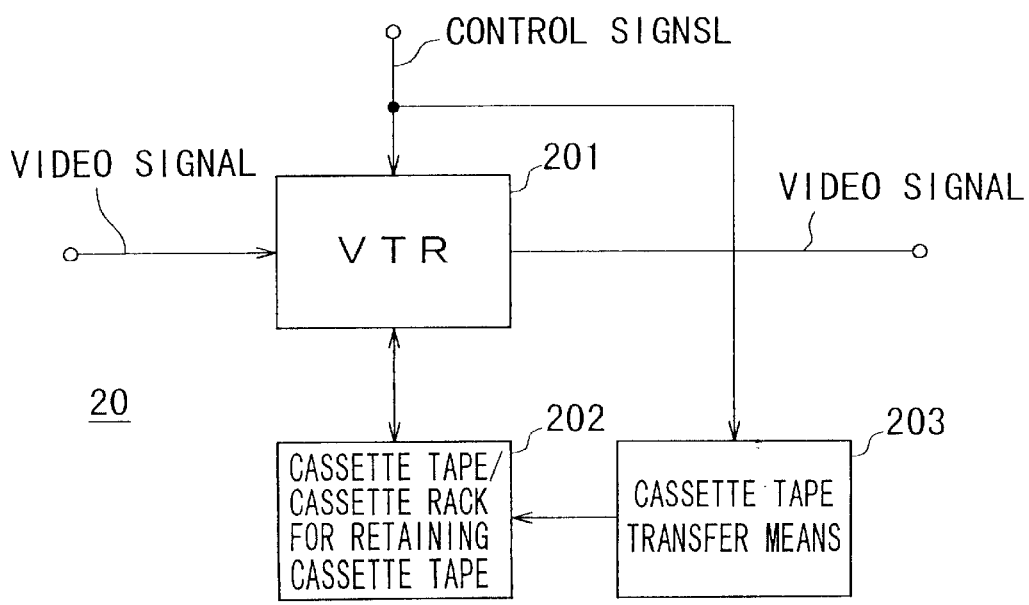
FIG. 2 is a schematic view of a play list.
FIG. 3 is a schematic flow diagram of a cassette changer apparatus as an automatic changer.

The cassette change apparatus 20 comprises a plurality of cassette racks 202 for retaining cassette tape, a video cassette recorder (VTR) 201 for recording input video signal constituting the material data on the cassette tape and reproducing the material data recorded on the cassette tape taken out of the cassette racks 202, a cassette tape transfer means 203 for transferring the cassette tape selectively from the cassette tape racks 202 to the VTR 201 and vice versa, as shown in FIG. 3 Therefore, all the material codes sent out from the sending device 22 are stored in the cassette changer apparatus 20.

The material codes to be sent out, which is reproduced by the cassette changer apparatus 20, are stored once in the video server 40, as shown in FIG. 1. A randomly accessible recording media such as hard disks (HDD) is used illustratively as recording media for the video server. Therefore, this provides a faster way for reading out a predetermined material. data to be sent out, as compared with VTR. Further, this permits a plurality of channels to perform their simultaneous input and output processing, Thus, this eliminates a need for using a plurality of VTRs, as compared with a case when the VTR is used as recording media for video server. The video server 40 will be explained hereinafter.

The sending device 22 sends out (or broadcasts) the material data such as commercials read out from the video server 40 together with other broadcasting programs.

The VITC reader (reading apparatus for reading VITC codes) 24 extracts the material code constituting identification code from the data into which the material codes have been inserted. The VITC reader 24 reads out VITC codes from video data into which the VITC codes have been inserted, out of the material data sent out from the video server 40.

VITC code will be explained in a more detail using FIG. 4.

The VITC code is superimposed within one horizontal scanning interval in the 12th or the 14th line of each image field. The time code is repeated four times in a field and thereby, this minimizes ill effects such as a dropout.

FIG. 4 shows data configuration of VITC code superimposed within one horizontal scanning interval.

As shown in FIG. 4, SMPTE (society of Motion Picture and Television Engineering) time code of 64 bits is divided into eight unit groups of 6 bits, synchronous bits of two bits are added to each of the unit groups, and CRC (cyclic redundancy check) code of 8 bits is added thereto. Thus, the VITC code is made up of 90 bits Respective unit groups of 8 bits are assigned to indicate units and tens of frames, seconds, minutes and hours. In each of the unit groups of 8 bits, the number of units is represented by four bits and the number of tens is represented by two bits. Further, user's bits (binary group) of four bits are added thereto. The user's bits freely available to the user are composed of first to eighth binary groups of four bits, namely sum of 32 bits. Generally, the user's bits are inserted to indicate years, months, days, days of the week and the like.

In the data sending-out system as shown in FIG. 1, the user's bits are inserted to indicate material code (identification code of the material data) and date added every the material data. Specially, when the material code is inserted, 20 bytes of five flames in which one frame is composed of 32 bits (=4 bytes), are used. The material code is inserted into the user's bit area after one second, 15 frames, has elapsed since a lead of video file.

Terminal processing device (PC) 26 reads the material code from the user's bits of VITC code based on VITC code output from VITC reader 24 and generates history information composed of the material code and the sending (reproducing) time to store the history information in the recording device, for example, a log memory 32 such as hard disk or semiconductor memory installed in the terminal processing device 26. Therefore, the VITC reader 24 and the terminal processing device 26 constitute history information generating apparatus.

An example of the output history information is shown in FIG. 5. The output history information is composed of the material code of the output material data, and the data (a day, hour, minute, second and frame) indicating sending time of the material data. Except for the cases where any trouble occurs in sending the data and where special program is broadcast, this output history information is identical to the play list shown in FIG. 2. FIG. 4 illustrates an example of the output history information when said history information is identical to the play list shown in FIG. 2.

The monitor 28 displays the output history information generated by the terminal processing device 26, namely, the information (hour, minute, second and frame) as to when any material data is sent out. Cathode ray tube (CRT) or liquid crystal device is used as the monitor 28.

The printer 30 is used for printing out the output history information generated by the terminal processing device 26 based on the instruction from the terminal processing device 26.

The operations of the data recording and reproduction apparatus 10 composed as the above will be explained.

The system controller 16 detects a filing target material code based on the play list delivered from the APC 12 and controls the cassette changer apparatus 20 based on the instructions issued from the PC 18 for user interface. In other words, the cassette tape retained in the cassette racks 202 is taken out from the cassette racks 202 and is loaded into the VTR 201 to read out the target material data by following the instructions from the system controller 16. This material data is recorded on storage means within the video server 40. The material code corresponding to the material data is recorded on the storage means with the material code being inserted into the user's bits of VITC code.

The system controller 16 also controls the video server 40 according to the play list. The video server 40 transmits the material data read out from the storage means within it to the sending device 22 from which the material data is sent out as the broadcast signal (is broadcast). When the material data is read out from the storage means, VITC code inserted into the material data by VITC reader 24 that is connected with a material data sending series, is read out together with the material data. The VITC code is transferred to the terminal processing device 26. The terminal processing device 26 reconstitutes the material code from the user's bits of VITC code. Log memory 32 stores the reconstituted material code and the data indicating the sending time as the output history information (log). The monitor 28 displays the output history information and the printer 30 prints it.

Next, the constitution and operations of the video server 40 will be explained.

As shown in FIG. 6, the video server 40 comprises server controller 42, a plurality of input processing means (input port) 50, a plurality of output processing means (output port) 60, storage means interface 44 and randomly accessible storage means 46.

The server controller 42 controls various function blocks inside the video server 40 in accordance with external control signals from the system controller 16. Time slot is assigned to the input port 50 and the output port 60, respectively, on a time division basis. Within such assigned time slot, respective input and output ports 50 and 60 feed an input data to the storage means 46 and the data is output from the storage means 46. In this respect, the server controller 42 provides exclusive control over the input and output ports 50 and 60 gaining access to the storage means 46.

The video server 40 has a file system that manages in units of files a plurality of video data held in the storage means 46. The file system manages a plurality of data in units of files and organizes the recorded location of the file in the hard disk 46. As shown in FIG. 7, file entry FE (see FIG. 7A), record entry RE (see FIG. 7B) and free space list FSL (see FIG. 7C) constitute the file system.

A name of file and pointer information to a first record entry are written to the file entry, as shown in FIG. 7A. Thus, the file entry FE is set in a unit of file and the file entry FE links the record entry RE having information indicating that the starting location to write the file on the hard disk, and its recording length.

Leading location data indicating the address of the leading location of the file written actually on the hard disk 46 and the data having a data length of continuous area showing how long the data continues to be written on the hard disk 46 from the address of leading location, are written to the record entry RE, as shown in FIG. 7B.

When one file is written on the hard disk 46 as discrete data, pointer information (pointer to the address of leading location of discrete portions) to next record entry indicating link information to next discrete location, i.e., link information to the next record entry, is written. Where the file is completed in the continuous area, end of file (EOF) is written to link area to the record entry RE.

Information indicating data free area is written to free space list FSL. Pointer information to next free space list, leading location data indicating address of the leading location of continuous space area, and the data having a data length of continuous space area showing how long the data free area continues from the address of leading location, are written to the free space list FSL, as shown in FIG. 7C.

Further, operation from the file entry to the free space list in a specified example will be explained.

It is assumed as the specified example that a file A is written to address space on the hard disk 46 as shown in FIG. 7D.

In this case, the file A is written to addresses 50 to 100, 200 to 300, 500 to 750 on a discrete basis so that the file entry FE and the record entry RE are composed so as to become those as shown in FIGS. 7E and 7F, respectively.

The name of file A is written to file name area of the file entry FE because the file A is recorded on the hard disk 46. Further, the pointer information to next record entry RE is written to indicate target link in order to link next record entry. In the case shown in FIG. 7D, the file A is written to three discrete areas and thus, the pointer information to second record entry RE (2), address 50 of the leading location of the file A, and data length (50 address) of the continuous area from the address 50 of leading location are written to first record entry RE (1), To the next record entry RE (2), the pointer information to third record entry RE (3), address 200 of the leading location of the second discrete portion of the file A, said portion being written next, and data length (100 address) of the continuous area from the address 200 of the leading location of the second discrete portion are written. To the final record entry RE (3), address 500 of the leading location of the final discrete portion of the file A and data length (250 address) of the continuous area from the address 500 of the leading location of the final discrete portion are written. In this final case, writing of the file A is completed and no link to next continuous area occurs. Therefore, the data indicating EOF is written to the final record entry RE (3) as link information.

In the case shown in FIG. 7D, data free areas with addresses 0 to 50 (50 address), 100 to 200 (100 address), and 300 to 500 (200 address) occur. To the free space list FSL indicating data free area information, the data is written, as shown in FIG. 7G.

The pointer information to second free space list FSL (2) to be linked, address 0 of the leading location of the continuous space area, and data length (50 address) of the first continuous space area from the address 0 of leading location are written respectively to first free space list FSL (1).

To the next free space list FSL (2), the pointer information to third free space list FSL (3) to be linked, address 100 of the leading location of the second continuous space area, and data length (100 address) of the second continuous space area from the address 100 of the leading location are written, respectively. To the final free space list FSL (3), address 300 of the leading location of the final continuous space area and data length (200 address) of the final continuous space area from the address 3000 of the leading location are written, respectively. In this final case, next continuous space area does not occur. In this case, the data indicating EOF is written to the final free space list FSL (3) as link information.

Alternatively, a constitution of a plurality of input ports 50 (50A, 50B, - - - , 50N) are identical to each other. The input port 50 comprises an input video interface 52, data compressing means 54 and multiplexer 56, like the input port 50A.

The input video interface 52 is designed to separate the input data input with a predetermined transfer format into an effective video signal portion and a synchronous signal portion.

The predetermined transfer format is exemplified by a transfer data based on SDI (Serial Digital Interface) format compliant with SMPTE (Society of Motion Picture and Television Engineering) standard (SMPTE-259M), and a transfer data based on SDTI (Serial Digital Transfer Interface) format compliant with SMPTE-305M standard, in addition to, a transfer data having asynchronous series transfer format such as ATM (Asynchronous Transfer Mode) and Fibre Channel.

The separated video signal portion is supplied to the data compressing means (bit rate reduction encoder) 54 for video data compression according to compression system illustratively using interframe correlation based on MPEG (Moving Picture Experts Group) recommendations. As other compression system, DV system that is an intraframe compression system, maybe also used.

Input video signal includes composite signals (e.g., video signals in D1 format) and component signals (e.g., analog video signals and video signals in D2 format). These video signals contain the VITC (Vertical Interval Time Code) code, i e., a time code pursuant to SMPTE-R159 and other criteria.

The input video interface 52 executes separation processing between this VITC code and video signal to prevent VITC code from being compressed together with the video signal. The multiplexer 56 receives the video signals compressed by the bit rate reduction encoder 54 and the VITC codes compressed by the input video interface 52, and multiplexes them to output the multiplexed data. The storage means interface 44 is an interface for the input and output ports 59 and 60 and the storage means 46. The interface 44 superimposes control instruction (command) issued from the server controller 42 on the data output from the input port 50. Then, the interface 44 outputs superimposed data. In turn, the interface 44 extracts the data to be output to the output port 60 from the data containing status corresponding to said command output from the storage means 46, and outputs extracted data to the output port 60.

The storage means 46 is composed of nonlinear accessible recording media. In this embodiment, the storage means 46 is composed of a RAID (redundant arrays of inexpensive disks) type hard disk device made up of a plurality of hard disk drives which are arranged so as to be stacked vertically each other.

The multiplexer 56 multiplexes said material code together VITC code and compressed video signal and outputs multiplexed data. The server controller 42 supplies the material code itself to the multiplexer 56. As described above, the material code is inserted into the user's bit area after one second, 15 frames, has elapsed since a lead of compressed video signal file using five flames (20 bytes) in user's bits area (4 bytes) of VITC code.

Figure 8:
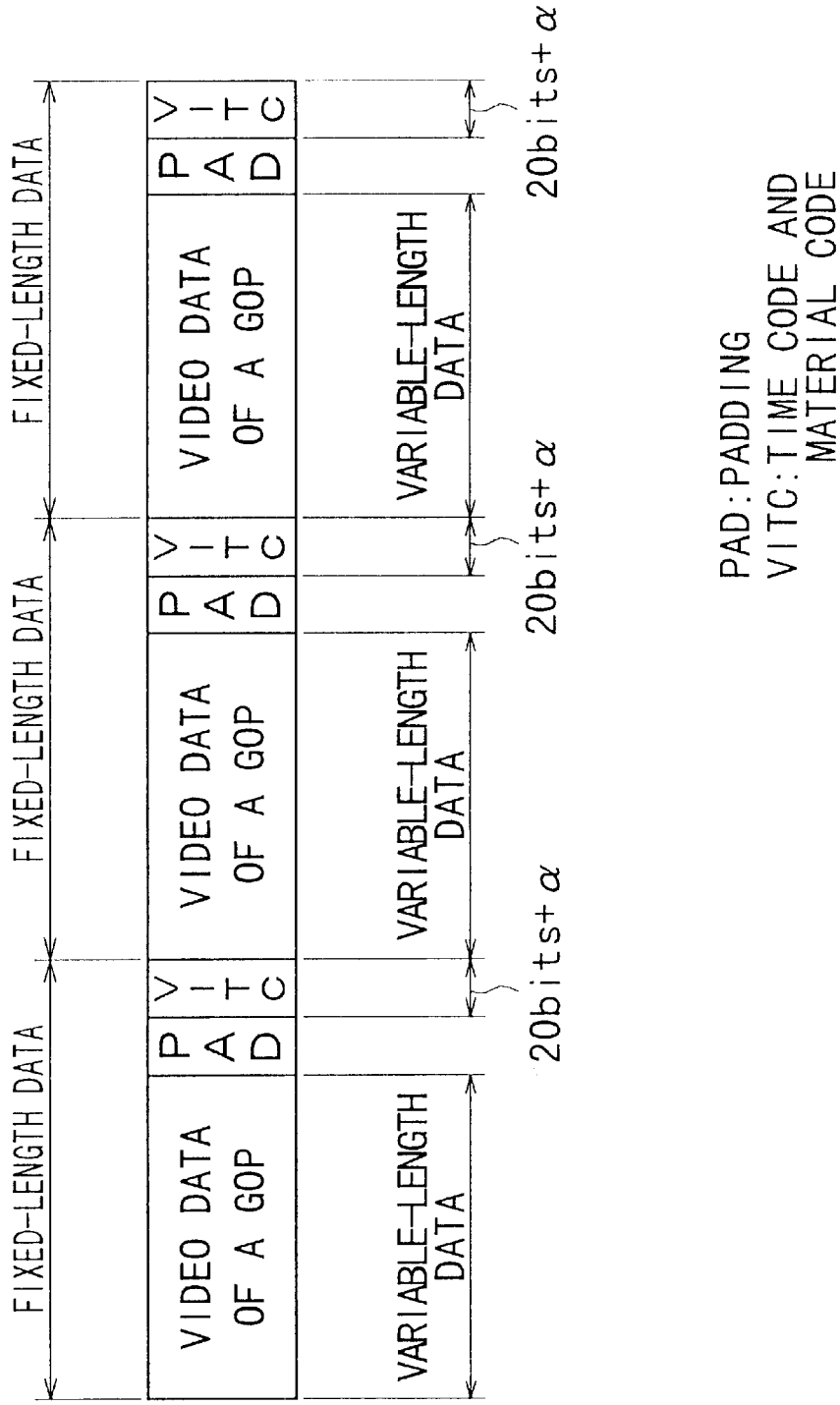
FIG. 8 is a view showing an embodiment of data format.

The multiplexed data output from the multiplexer 56 has a data structure as shown in FIG. 8. Placement and record of the VITC code on a particular position in fixed-length segment result in ensuring an easy access to the recorded VITC. However, compressed video data multiplexed is variable-length data. Therefore, padding data are padded to the compressed video signal and thus, the compressed video signal keeps its fixed-length data segment form.

The fact that VITC code is inserted into a specific location of each fixed-length segment makes it easy to extract and separate the VITC code. Values in the material codes may be updated under control of the server controller 42.

Further, a constitution of the output port 60 will be described. The output port 60 also includes a plurality of output ports, each having an identical structure. The output port 60A, representative of the remaining output ports, comprises a demultiplexer 62, a bit rate reduction encoder 64 and an output video interface 66. The demultiplexer 62 separates the fixed-length data into a compressed video signal portion and a VITC code. The bit rate reduction decoder 64 expands the compressed video signal portion The output video interface 66 receives effective video signal and separated VITC code, and outputs video signal in which synchronous signal is added to the effective video signal and the separated VITC code.

In the embodiment as shown in FIG. 6, the input and output ports 50, 60 handle the video data and the VITC code for simplifying the description. Of course, the remaining units may handle them.

The operations of the video server 40 as composed above will be described.

The input port 50A receives the input data with a predetermined format (for example, SDI format and SDTI format) whereby input data interface 52 separates the input data into video data and VITC code. The bit rate reduction encoder 54 compresses the separated video data. The multiplexer 56 multiplexes the compressed video data and VITC code. When the server controller 42 assigns time slot to multiplexed data, the storage means 46 records it through the storage means interface 44. Further, the multiplexed data recorded on the storage means 46 is read out using the time slot assigned by the server controller 42.

The output port 60 receives the data read out whereby the demultiplexer 62 separates the data into compressed video data and the VITC code. The bit rate reduction decoder 64 expands the compressed video data separated, Then, the output video interface 66 adds VITC code and synchronous signal to the expanded video data (effective video signal) and outputs the added data.

Such a video server 40 having the constitution and operations as described above, outputs the video signal inserted VITC code. As shown in FIG. 1, the VITC reader 24 receives the video signal and reads out VITC code from the video signal. The terminal processing device (PC) 26 receives the VITC code read out by the VITC reader 24 and separates the VITC code into the material code inserted into the user's bits area of VITC code and time code (reproduction time). The material code is spread out over a plurality of frames, and thus, the spread material codes are collected and reconstituted to one material code corresponding to the reproduction video source (material data).

The terminal processing device 26 stores the material code and the reproduction time data respectively on the log memory 32 as output history information (output log) The output log is displayed on the monitor 28 at an arbitrary timing and is produced as hard copy output through the printer 30.

The operations of the system for sending out data using the data recording and reproduction apparatus as composed above will be explained. The operations of this system will be explained according to two separate processes: a data accumulating process (hereinafter called "filing process") for accumulating the data including video data as shown in FIG. 9 and a data reproduction process for reproducing the data recorded in the filing process.

Figure 9:
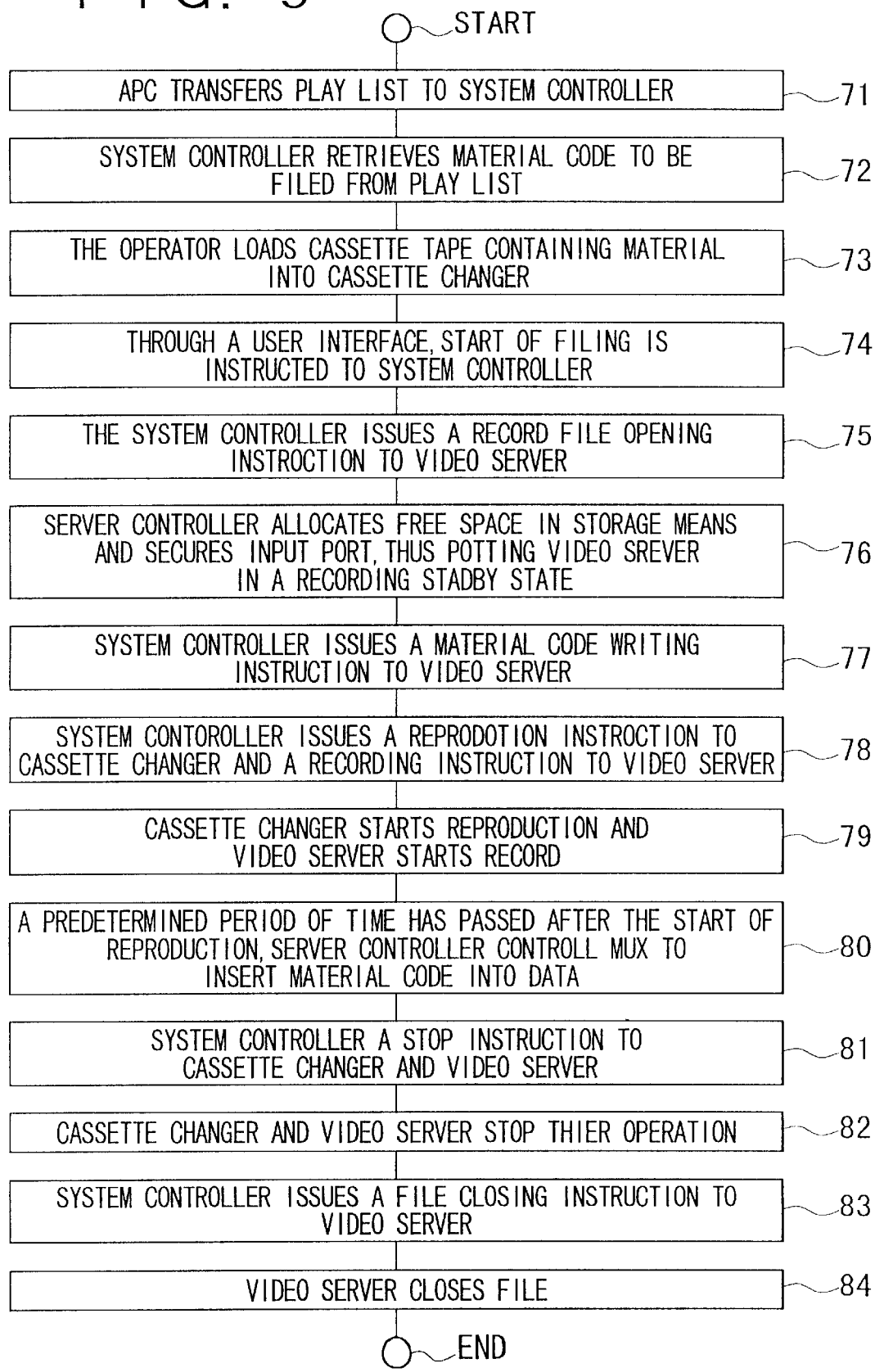
FIG. 9 is a flowchart of steps showing an embodiment of filing process.

As shown in FIG. 9, when a filing process is started, the program controller (APC) 12 transfers a play list to the system controller 16 (step 71). The system controller 16 retrieves from the play list the material code to be filed, and stores the retrieved material code (step 72).

The operator handling the filing process operates the cassette changer apparatus 20 to load the cassette tape on which the material data in question is recorded into VTR 201 (step 73). This step may be carried out alternatively at the start of the process. Through the user interface 18, the control instruction to start executing the filing process is issued to the system controller 16 (step 74). In response, the system controller 16 issues to the video server 40 a record file opening instruction to request a permission to a use of record file (step 75).

The server controller 42 allocates a free space in the storage means 46 and secures one of the input ports 50 to be used (step 76). For this reason, referring to a file system shown in FIG. 7, particularly, the free space list shown in FIG. 7C, a capacity of space area may be held. Therefore, the free space may be ensured according to the free space list.

Further, in order to allow the server controller 42 to secure one port 50A of the input ports 50, the instruction to request a permission to a use of particular port of higher system controller 16 causes the securement of the input port 50A. This puts the video server 40 in a recording standby state.

Then, the system controller 16 issues a material code writing instruction to the video server 40 (step 77), while issuing a reproduction instruction to the cassette changer apparatus 20 and a recording instruction to the video server 40 (step 78). This causes the cassette changer apparatus 20 to reproduce the material data and the video server 40 to record the reproduced material data (step 79).

A predetermined period of time has passed after the start of the reproduction, the server controller 16 causes the multiplexer 56 to insert a material code into the compressed video signal (step 80). The system controller 16 issues a stop instruction to both the cassette changer apparatus 20 and the video server 40 to stop their operations (steps 81 and 82). The system controller 16 then issues a file closing instruction to the video server 40 to terminate the filing process (steps 83 and 84). This file closing instruction is the instruction to terminate the use of the target file that has been requested to permit the use thereof by record file opening instruction. This instruction shows the completion of a series of instructions to the files and devices.

The material code writing instruction issued to the video server 40 causes the server to initially designate a file in which to write user bits (file handle). The location to which to write the user bits is designated as an offset relative to the top of the file. The material code arrangement allows the video server 40 to function on a real time basis. Because the process of assigning a material code to user bits is performed by the video server 40, the system controller 16 may issue beforehand a user bit writing instruction.

Figure 10:
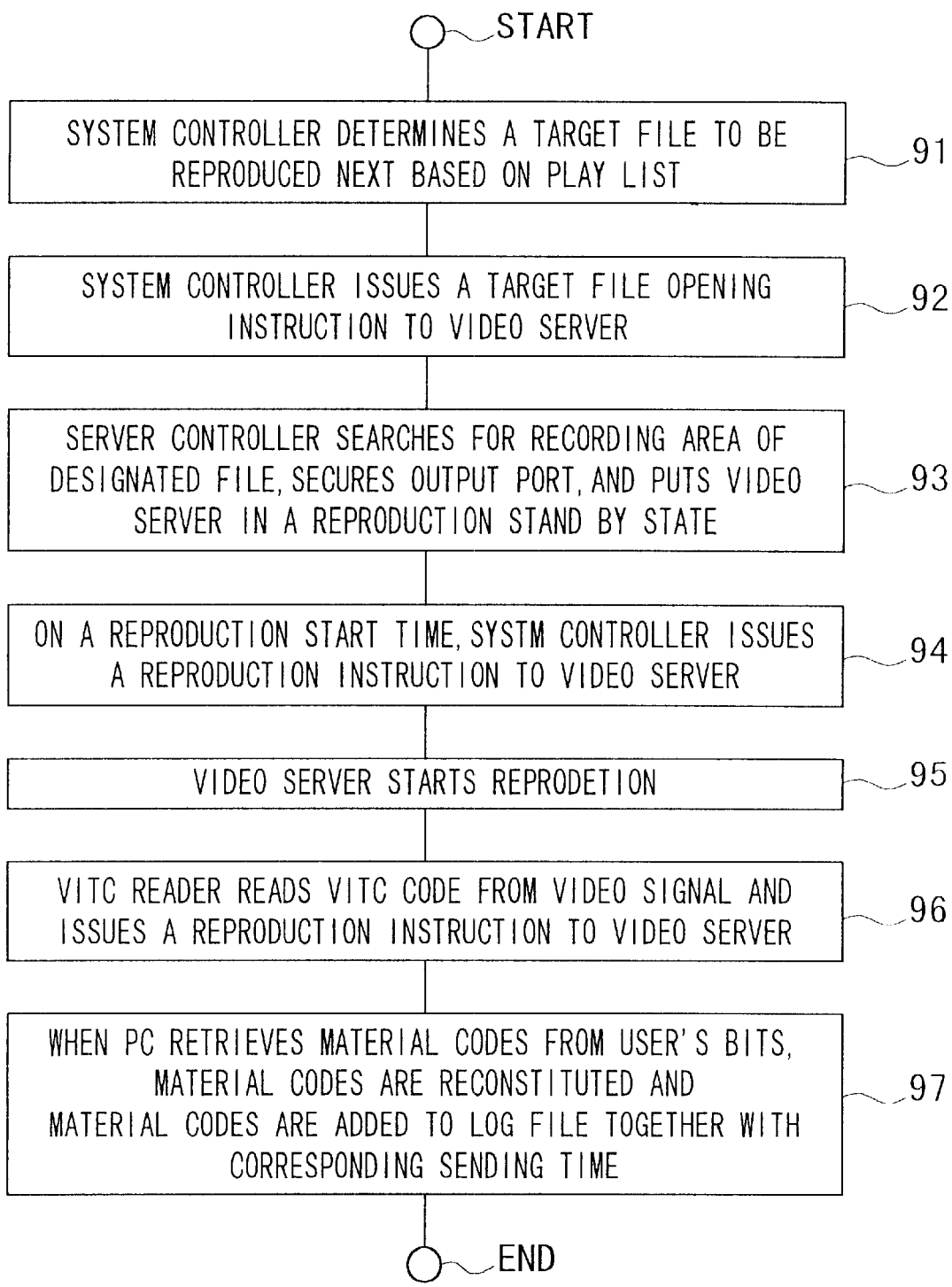
FIG. 10 is a flowchart showing an embodiment of a reproducing process.

The reproduction process of the data accumulated in the filing process will be described according to FIG. 10.

The system controller 16 first determines the file to be reproduced next in accordance with the play list. With the target file thus determined, the system controller 16 issues a target file opening instruction to the video server 40 (steps 91 and 92). The server controller 42 then secures one of the output ports 60, searches for the recording area of the designated file, and puts the video server 40 in a reproduction standby state (step 93).

When a reproduction start time is reached, the system controller 16 issues a reproduction instruction to the video server 40. The video server 40 reproduces contents of the file (steps 94 and 95). The VITC reader 24 extracts and separates a VITC code from the reproduced video signal and sends values of a time code and user's bits to the terminal processing device 26 (step 96). The terminal processing device 26 retrieves material code from the user's bits to reconstitute a material code. The material code, when reconstituted, is written to the log file (history file) together with the corresponding sending time and date (step 97). This makes it possible automatically to acquire both the material code representing an actually output commercial or program and a log of the time at which the output actually took place.

Although the inventive automatic changer apparatus above has been shown using an automatic cassette changer apparatus, this is not limitative of the invention. Any other automatic changer apparatus for disk recording media such as an MO (Magnet Optical) disk or a DVD (digital video disk) may be used instead.

Although the recording media of storage means 46 above has been shown using a hard disk HD, this is not limitative of the invention. Any other recording media such as a disk recording media, for example, DVD and MO, and randomly accessible recording media, except for the hard disk, such as a semiconductor memory, for example, D-RAM and flush memory, may be used instead.

The inventive apparatus, method and system thus make it possible to generate video source output history information easily and automatically. When the invention is applied illustratively to a commercial/program output system, material codes representing actually output commercials or programs are obtained together with a log of times at which the commercial or program outputs actually took place. Such output history information permits an easy and accurate confirmation that specific commercial or program has been actually broadcast.

In that sense, the invention applies very preferably to a data recording and reproduction apparatus and a data output system, which are used for the data, for example, commercial and program.

As many apparently different embodiments of this invention may be made without departing from the spirit and scope thereof, it is to be understood that the invention is not limited to the specific embodiments thereof except as defined in the appended claims.

What is claimed is:

1. A data recording and reproduction apparatus for recording and/or reproducing data comprises:
   nonlinear accessible recording media;
   a plurality of input and output processing means for adding to the data an identification code of the data with time slots respectively assigned thereto, outputting the added data to the recording media and reading out from the recording media the data recorded on the recording media with the same time slots as the above;
   extracting means for extracting the identification code output as sending data from the input and output processing means and included in the sending data; and
   history information generating means for generating history information constituted by the identification code extracted from the extracting means, said identification code including a sending time.

2. The data recording and reproduction apparatus according to claim 1, further comprising a controlling means for reading out the data from the recording media and controlling said plurality of input and output processing means to output the read data from one of said plurality of input and output processing means.

3. The data recording and reproduction apparatus according to claim 2, wherein said controlling means reads out said sending data from said recording media based on a play list composed of a sending time of sending material and a sending identification code, and outputs said sending data through said one of said plurality of input and output processing means.

4. The data recording and reproduction apparatus according to claim 3, wherein said plurality of input and output processing means comprises:
   interface means for extracting from video data received from an external a time code added thereto to separate the video data from the time code;
   compressing means for compressing the video data output from said interface means; and
   multiplexing means for receiving compressed video data output from said compressing means and said time code output from said interface means, and multiplexing said compressed video data and said time code together with said identification code output from said controlling means;
   wherein the multiplexed data output from said multiplexing means is recorded on said nonlinear accessible recording media.

5. The data recording and reproduction apparatus according to claim 4, wherein said time code is VITC time code and said identification code is inserted into user area of the VITC time code.

6. The data recording and reproduction apparatus according to claim 1, wherein said data is video data for a use in a commercial and/or a broadcast program.

7. The data recording and reproduction apparatus according to claim 1, wherein said identification code is composed of information f or identifying the video data f or a use in a commercial and/or a broadcast program, and information showing a video sending time.

8. The data recording and reproduction apparatus according to claim 1, further comprising video server including:
   storage means including randomly accessible storage media; and
   control means for controlling s aid storage means, a connected to the storage means,
   wherein said input port means containing identification code insert means for inserting into data supplied to said input port means, identification code of the data, and
   wherein said data containing said identification code is recorded on said storage means.

9. The data recording and reproduction apparatus according to claim 8, wherein said input port means includes data separator means, in addition to said identification code insert means, for separating said input data into a synchronous data portion and a synchronous data free portion.

10. A system for sending out data comprising:
    nonlinear accessible storage media for storing the data;
    a plurality of input and output processing means;
    a data recording and reproduction apparatus for recording the data on the recording media by allowing the plurality of input and output processing means to obtain access to the recording media with time slots respectively assigned thereto and for reading out from the recording media the data recorded thereon;
    extracting means for receiving the data output from the data recording and reproduction means and for extracting from said data an identification code of and sending time of the data to be sent out;
    history information generating means for generating history information from said identification code and said sending time extracted by said extracting means; and
    sending means for receiving the data output from said data recording and reproduction means and for sending out the received data to an external.

11. The system for sending out data according to claim 10, further comprising an automatic cassette changer apparatus including:

a plurality of racks for retaining cassette tape;

video cassette recorder for reproducing said data recorded on said cassette tape; and transfer means for transferring said cassette tape selectively from said rack to said video cassette recorder and vice versa, wherein said plurality of input and output processing means of said data recording and reproduction apparatus receive said data output from said automatic cassette changer apparatus.

12. A method for sending out data in which nonlinear accessible recording media and a plurality of input and output processing means are used, and said plurality of input and output processing means get access to recording media with respectively time slots assigned thereto to record the data on the recording media and read out from the recording media the data recorded thereon to send out the data, said method comprising the steps first step of adding an identification code of material data to the material data and recording the material data containing the identification code on the recording media, said material data being output from the plurality of input and output processing means and being data of a predetermined unit;

second step of reading out from the recording media said material data recorded thereon with the same time slots assigned thereto as the above and outputting the read material data;

third step of extracting the identification code of the material data from the material data output in the second step;

fourth step of generating history information composed of the identification code extracted in the third step and the sending time of the material data.

13. The method for sending out data according to claim 12, wherein said identification code of the material data is inserted into user bit area of the VITC time code of said material data.

14. The method for sending out data according to claim 12, wherein, in said second step, said plurality of input and output processing means reading out said material data from said recording media based on play list information, said play list information being composed of a sending time of said material data to be sent out and said identification code, and outputs the read data.

15. The method for sending out data according to claim 13, wherein said first step comprises the substeps:

separating said material data output from an external into VITC time code added thereto and data including video data, compressing at least video data out of the separated data including the video data to generate compressed video data; and multiplexing data including said compressed video data and said VITC code and adding identification code of said material data to these multiplexed data to record the added data on the recording media.

* * * * *